(12) United States Patent
Battaglia (10) Patent No.: US 9,398,647 B2
(45) Date of Patent: Jul. 19, 2016

(54) AUTOMATIC POWER CONTROLLER

(71) Applicant: Phoseon Technology, Inc., Hillsboro, OR (US)

(72) Inventor: Salvatore T. Battaglia, Vancouver, WA (US)

(73) Assignee: Phoseon Technology, Inc., Hillsboro, OR (US)

(*) Notice: Subject to any disclaimer, the term of this patent is extended or adjusted under 35 U.S.C. 154(b) by 0 days.

(21) Appl. No.: 14/563,914

(22) Filed: Dec. 8, 2014

(65) Prior Publication Data

US 2016/0165683 A1    Jun. 9, 2016

(51) Int. Cl.
*H05B 33/08* (2006.01)

(52) U.S. Cl.
CPC .......... *H05B 33/0812* (2013.01); *H05B 33/089* (2013.01)

(58) Field of Classification Search
CPC .......... H05B 33/0854; H05B 33/0803; H05B 33/0815; H05B 33/0884; H05B 41/28; H05B 41/2824; H01J 61/52; Y02B 20/347; Y02B 20/36; G01K 7/22; G01K 7/25

USPC ......... 315/112, 117, 247, 224, 291, 307, 309, 315/312; 374/179, 182, 183, 185
See application file for complete search history.

(56) References Cited

U.S. PATENT DOCUMENTS

| 4,576,487 | A  | * | 3/1986 | Conover, Jr. | G01K 7/25 374/179 |
| 7,423,387 | B2 | * | 9/2008 | Robinson | G09G 3/14 315/169.3 |
| 7,576,525 | B2 | * | 8/2009 | So | G05F 1/56 323/276 |
| 7,777,430 | B2 | * | 8/2010 | Catalano | H05B 33/0803 315/185 S |
| 9,109,777 | B2 | * | 8/2015 | Childers | F21V 5/045 |

* cited by examiner

*Primary Examiner* — Haissa Philogene
(74) *Attorney, Agent, or Firm* — Alleman Hall McCoy Russell & Tuttle LLP (57) ABSTRACT

Systems and methods for operating one or more light emitting devices are disclosed. In one example, the a negative temperature coefficient control parameter is applied to an amplifier to adjust a gain of the amplifier so as to provide a substantially constant level of irradiance output from one or more light emitting devices.

18 Claims, 6 Drawing Sheets

AUTOMATIC POWER CONTROLLER

BACKGROUND/SUMMARY

Irradiance output of solid-state lighting devices may be influenced by operating temperature. Consequently, if the solid-state lighting device is at room temperature and a constant voltage is applied to the solid-state lighting device, the irradiance output from the solid-state lighting device may be greater than if the same constant voltage were applied to the same solid-state lighting device at the solid-state lighting device's nominal operating temperature.

Solid-state lighting devices have many uses in industrial applications. For example, ultraviolet (UV) solid-state lighting devices may be used to curing photo sensitive media such as coatings, including inks, adhesives, preservatives, etc. Curing time of these photo sensitive media may be responsive to solid-state lighting device irradiance output. Consequently, if the solid-state lighting devices operate at temperatures away from their nominal operating temperature, photo sensitive media may not cure sufficiently or electrical power consumption may increase due to changes in solid-state light device irradiance levels.

The inventor herein has recognized the above-mentioned disadvantages and has developed a system for operating one or more light emitting devices, comprising: at least one light emitting device; a negative temperature coefficient device in thermal communication with the at least one light emitting device; and an amplifier including a negative feedback loop, the negative temperature coefficient device included in the negative feedback loop.

By incorporating a negative temperature coefficient device into a negative feedback loop of an amplifier that controls current flow through one or more light emitting devices, it may be possible to more precisely control light emitting device irradiance over a wide range of operating temperatures. For example, when temperature of light emitting devices is lower than a nominal operating temperature of the light emitting devices, current flowing through the light emitting devices may be restricted or limited so that the light emitting devices output a substantially constant irradiance level corresponding to an irradiance level of when the light emitting devices are operated at the nominal operating temperature. In this way, the irradiance output of light emitting devices may be controlled to a substantially constant level so that curing of photo sensitive media may be more precisely controlled.

The present description may provide several advantages. In particular, the approach may improve lighting system light intensity control. Further, the approach may provide lower power consumption via providing efficient electrical current control. Further still, the approach may provide more consistent curing of photo sensitive media.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
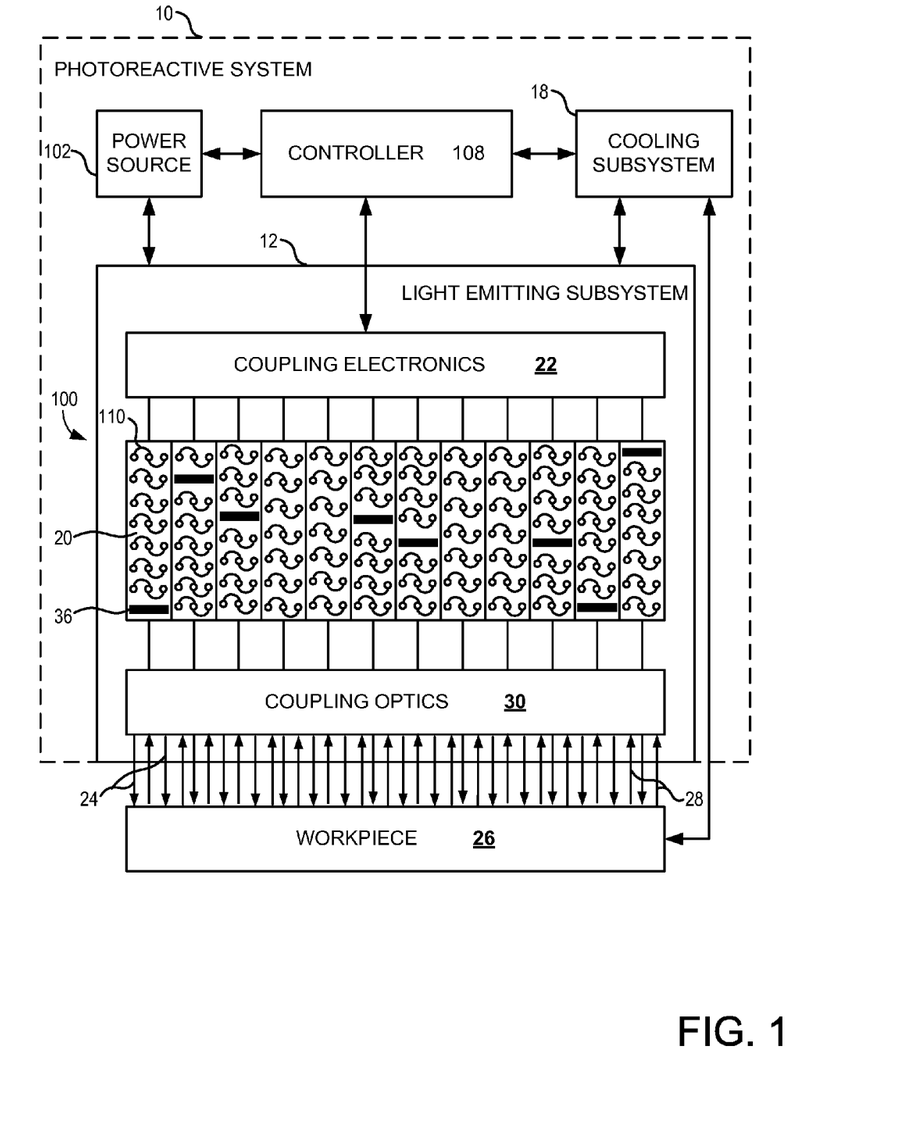
FIG. 1 shows a schematic depiction of a lighting system.

The present description is related to a lighting system that outputs a substantially constant (e.g., ±5%) irradiance level. FIG. 1 shows one example lighting system that includes an amplifier to control lighting array irradiance output. The lighting array irradiance control may be provided via the example circuits shown in FIGS. 2-4. However, alternative circuits that provide the described function or that operate similar to the circuits shown are also included within the scope of this description. The lighting system may include parameters that operate according to the plots of FIGS. 5 and 6. A method for operating a lighting system to provide substantially constant irradiance is shown in FIG. 7. Electrical interconnections shown between components in the various electrical diagrams represent current paths between the illustrated devices.

Referring now to FIG. 1, a block diagram of a photoreactive system 10 in accordance with the system and method described herein is shown. In this example, the photoreactive system 10 comprises a lighting subsystem 100, a controller 108, a power source 102 and a cooling subsystem 18.

The lighting subsystem 100 may comprise a plurality of light emitting devices 110. Light emitting devices 110 may be LED devices, for example. Selected of the plurality of light emitting devices 110 are implemented to provide radiant output 24. The radiant output 24 is directed to a work piece 26. Returned radiation 28 may be directed back to the lighting subsystem 100 from the work piece 26 (e.g., via reflection of the radiant output 24).

The radiant output 24 may be directed to the work piece 26 via coupling optics 30. The coupling optics 30, if used, may be variously implemented. As an example, the coupling optics may include one or more layers, materials or other structure interposed between the light emitting devices 110 providing radiant output 24 and the work piece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such micro-reflector array, each semiconductor device providing radiant output 24 may be disposed in a respective micro-reflector, on a one-to-one basis.

Each of the layers, materials or other structure may have a selected index of refraction. By properly selecting each index of refraction, reflection at interfaces between layers, materials and other structure in the path of the radiant output 24 (and/or returned radiation 28) may be selectively controlled. As an example, by controlling differences in such indexes of refraction at a selected interface disposed between the semiconductor devices to the work piece 26, reflection at that interface may be reduced, eliminated, or minimized, so as to enhance the transmission of radiant output at that interface for ultimate delivery to the work piece 26.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned radiation 28, or for other purposes, alone or in combination. As a further example, the photoreactive system 10 may employ coupling optics 30 so as to enhance the effective quality or quantity of the radiant output 24, particularly as delivered to the work piece 26.

Selected of the plurality of light emitting devices 110 may be coupled to the controller 108 via coupling electronics 22, so as to provide data to the controller 108. As described further below, the controller 108 may also be implemented to control such data-providing semiconductor devices, e.g., via the coupling electronics 22.

The controller 108 preferably is also connected to, and is implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, the lighting subsystem 100 may be of various types. As an example, the data may be representative of one or more characteristics associated with coupled semiconductor devices 110, respectively. As another example, the data may be representative of one or more characteristics associated with the respective component 12, 102, 18 providing the data. As still another example, the data may be representative of one or more characteristics associated with the work piece 26 (e.g., representative of the radiant output energy or spectral component(s) directed to the work piece). Moreover, the data may be representative of some combination of these characteristics.

The controller 108, in receipt of any such data, may be implemented to respond to that data. For example, responsive to such data from any such component, the controller 108 may be implemented to control one or more of the power source 102, cooling subsystem 18, and lighting subsystem 100 (including one or more such coupled semiconductor devices). As an example, responsive to data from the lighting subsystem indicating that the light energy is insufficient at one or more points associated with the work piece, the controller 108 may be implemented to either (a) increase the power source's supply of current and/or voltage to one or more of the semiconductor devices 110, (b) increase cooling of the lighting subsystem via the cooling subsystem 18 (i.e., certain light emitting devices, if cooled, provide greater radiant output), (c) increase the time during which the power is supplied to such devices, or (d) a combination of the above.

Individual semiconductor devices 110 (e.g., LED devices) of the lighting subsystem 100 may be controlled independently by controller 108. For example, controller 108 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 110, or may be from more than one array of semiconductor devices 110. Arrays of semiconductor devices 110 may also be controlled independently by controller 108 from other arrays of semiconductor devices 110 in lighting subsystem 100 by controller 108. For example, the semiconductor devices of a first array may be controlled to emit light of a first intensity, wavelength, and the like, while those of a second array may be controlled to emit light of a second intensity, wavelength, and the like.

As a further example, under a first set of conditions (e.g. for a specific work piece, photoreaction, and/or set of operating conditions) controller 108 may operate photoreactive system 10 to implement a first control strategy, whereas under a second set of conditions (e.g. for a specific work piece, photoreaction, and/or set of operating conditions) controller 108 may operate photoreactive system 10 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, and the different group of LED devices may include a subset of one or more LED devices from the second group.

The cooling subsystem 18 is implemented to manage the thermal behavior of the lighting subsystem 100. For example, generally, the cooling subsystem 18 provides for cooling of such subsystem 12 and, more specifically, the semiconductor devices 110. The cooling subsystem 18 may also be implemented to cool the work piece 26 and/or the space between the piece 26 and the photoreactive system 10 (e.g., particularly, the lighting subsystem 100). For example, cooling subsystem 18 may be an air or other fluid (e.g., water) cooling system.

The photoreactive system 10 may be used for various applications. Examples include, without limitation, curing applications ranging from ink printing to the fabrication of DVDs and lithography. Generally, the applications in which the photoreactive system 10 is employed have associated parameters. That is, an application may include associated operating parameters as follows: provision of one or more levels of radiant power, at one or more wavelengths, applied over one or more periods of time. In order to properly accomplish the photoreaction associated with the application, optical power may need to be delivered at or near the work piece at or above a one or more predetermined levels of one or a plurality of these parameters (and/or for a certain time, times or range of times).

In order to follow an intended application's parameters, the semiconductor devices 110 providing radiant output 24 may be operated in accordance with various characteristics associated with the application's parameters, e.g., temperature, spectral distribution and radiant power. At the same time, the semiconductor devices 110 may have certain operating specifications, which may be are associated with the semiconductor devices' fabrication and, among other things, may be followed in order to preclude destruction and/or forestall degradation of the devices. Other components of the photoreactive system 10 may also have associated operating specifications. These specifications may include ranges (e.g., maximum and minimum) for operating temperatures and applied, electrical power, among other parameter specifications.

Accordingly, the photoreactive system 10 supports monitoring of the application's parameters. In addition, the photoreactive system 10 may provide for monitoring of semiconductor devices 110, including their respective characteristics and specifications. Moreover, the photoreactive system 10 may also provide for monitoring of selected other components of the photoreactive system 10, including their respective characteristics and specifications.

Providing such monitoring may enable verification of the system's proper operation so that operation of photoreactive system 10 may be reliably evaluated. For example, the system 10 may be operating in an undesirable way with respect to one or more of the application's parameters (e.g., temperature, radiant power, etc.), any components characteristics associated with such parameters and/or any component's respective operating specifications. The provision of monitoring may be responsive and carried out in accordance with the data received by controller 108 by one or more of the system's components.

Monitoring may also support control of the system's operation. For example, a control strategy may be implemented via the controller 108 receiving and being responsive to data from one or more system components. This control, as described above, may be implemented directly (i.e., by controlling a component through control signals directed to the component, based on data respecting that components operation) or indirectly (i.e., by controlling a component's operation through control signals directed to adjust operation of other components). As an example, a semiconductor device's radiant output may be adjusted indirectly through control signals directed to the power source 102 that adjust power applied to the lighting subsystem 100 and/or through control signals directed to the cooling subsystem 18 that adjust cooling applied to the lighting sub system 100.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 110 or array of semiconductor devices 110 beyond their specifications while also directing radiant energy to the work piece 26 sufficient to properly complete the photoreaction(s) of the application.

In some applications, high radiant power may be delivered to the work piece 26. Accordingly, the subsystem 12 may be implemented using an array of light emitting semiconductor devices 110. For example, the subsystem 12 may be implemented using a high-density, light emitting diode (LED) array. Although LED arrays may be used and are described in detail herein, it is understood that the semiconductor devices 110, and array(s) of same, may be implemented using other light emitting technologies without departing from the principles of the description, examples of other light emitting technologies include, without limitation, organic LEDs, laser diodes, other semiconductor lasers.

The plurality of semiconductor devices 110 may be provided in the form of an array 20, or an array of arrays. The array 20 may be implemented so that one or more, or most of the semiconductor devices 110 are configured to provide radiant output. At the same time, however, one or more of the array's semiconductor devices 110 are implemented so as to provide for monitoring selected of the array's characteristics. The monitoring devices 36 may be selected from among the devices in the array 20 and, for example, may have the same structure as the other, emitting devices. For example, the difference between emitting and monitoring may be determined by the coupling electronics 22 associated with the particular semiconductor device (e.g., in a basic form, an LED array may have monitoring LEDs where the coupling electronics provides a reverse current, and emitting LEDs where the coupling electronics provides a forward current).

Furthermore, based on coupling electronics, selected of the semiconductor devices in the array 20 may be either/both multifunction devices and/or multimode devices, where (a) multifunction devices are capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices are capable of emission, detection and some other mode (e.g., off) and are switched among modes in accordance with the application parameters or other determinative factors.

Figure 2:
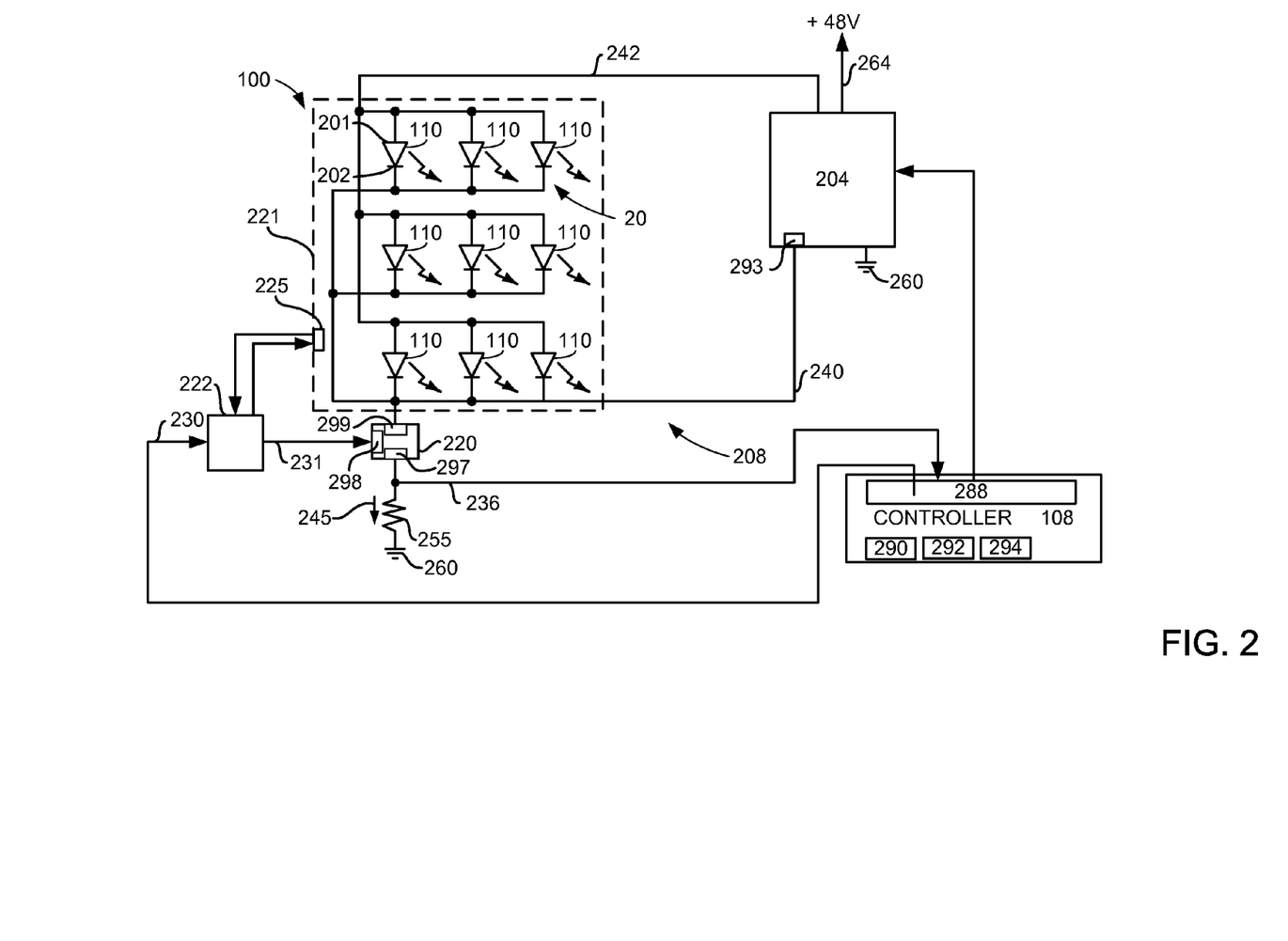
FIGS. 2-4 show schematics of example lighting device irradiance control systems.

Referring to FIG. 2, a schematic of a first lighting system circuit that may supply varying amounts of current is shown. Lighting system 100 includes one or more light emitting devices 110. In this example, light emitting devices 110 are light emitting diodes (LEDs). Each LED 110 includes an anode 201 and a cathode 202. Switching power source 102 shown in FIG. 1 supplies 48V DC power to voltage regulator 204 via path or conductor 264. Voltage regulator 204 supplies DC power to the anodes 201 of LEDs 110 via conductor or path 242. Voltage regulator 204 is also electrically coupled to cathodes 202 of LEDs 110 via conductor or path 240. Voltage regulator 204 is shown referenced to ground 260 and may be a buck regulator in one example. Voltage regulator 204 supplies electrical power to lighting array 20. Controller 108 is shown in electrical communication with voltage regulator 204. In other examples, discrete input generating devices (e.g., switches) may replace controller 108, if desired. Controller 108 includes central processing unit 290 for executing instructions. Controller 108 also includes inputs and outputs (I/O) 288 for operating voltage regulator 204 and other devices. Non-transitory executable instructions may be stored in read only memory 292 while variables may be stored in random access memory 294. Voltage regulator 204 supplies an adjustable voltage to LEDs 110.

Figure 3:
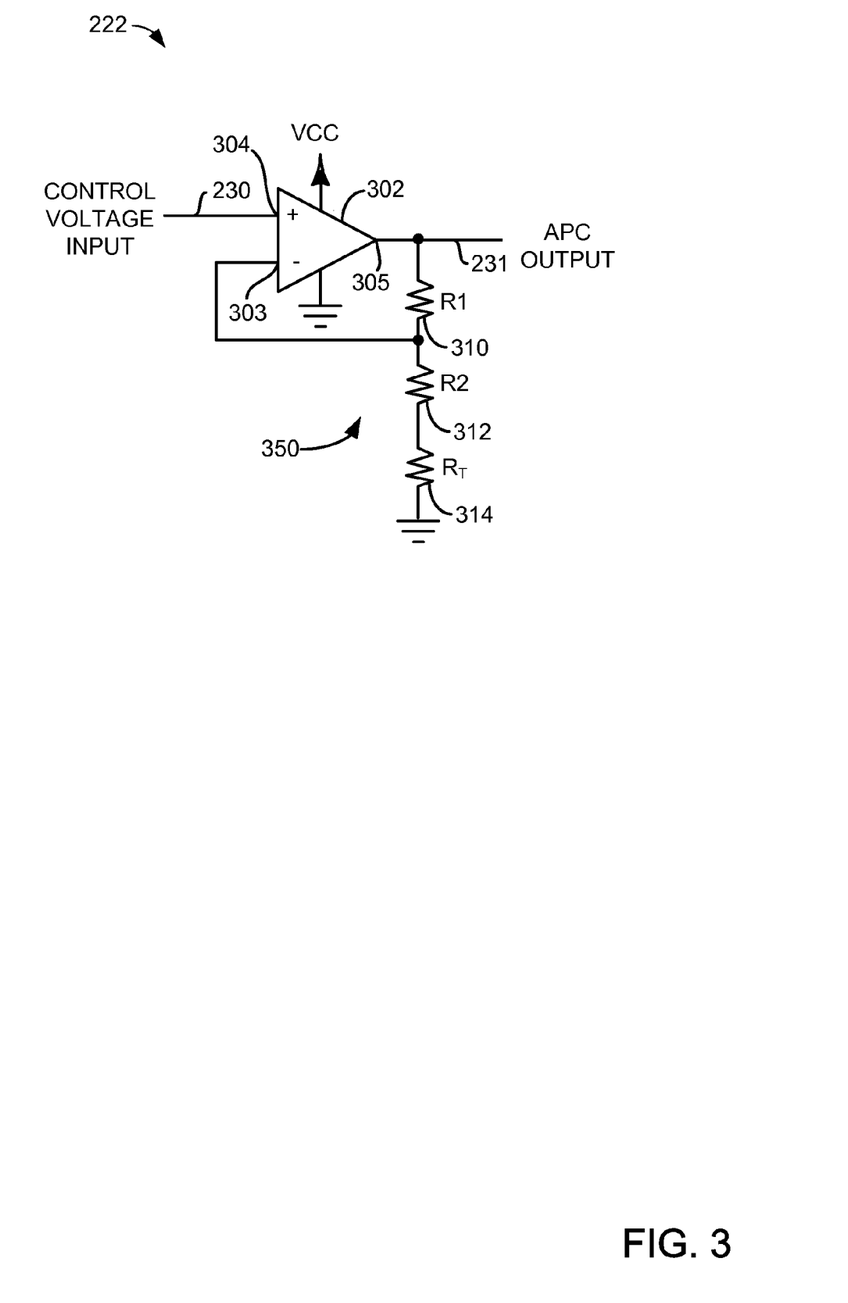

Variable resistor 220 in the form of a field-effect transistor (FET) receives an intensity or irradiance control signal voltage from controller 108 or via another input device from amplifier 222. Amplifier 222 supplies a control signal or output to FET gate 298 via conductor 231. Amplifier 222 receives an intensity or irradiance command from controller 108 at a non-inverting input as is shown in FIG. 3. Negative temperature coefficient device 225 (e.g., thermistor) is in a negative feedback loop or circuit of amplifier 222 as is shown in FIG. 3. Further, negative temperature coefficient device is in thermal communication with LEDS 110 via heat sink 221. FET source 297 is electrically coupled to current sense resistor 255. While the present example describes the variable resistor as an FET, one should note that the circuit may employ other forms of variable resistors.

In this example, at least one element of array 20 includes solid-state light-emitting elements such as light-emitting diodes (LEDs) or laser diodes produce light. The elements may be configured as a single array on a substrate, multiple arrays on a substrate, several arrays either single or multiple on several substrates connected together, etc. In one example, the array of light-emitting elements may consist of a Silicon Light Matrix™ (SLM) manufactured by Phoseon Technology, Inc.

The circuit shown in FIG. 2 is a closed loop current control circuit 208. In closed loop circuit 208, the variable resistor 220 receives an intensity voltage control signal via conductor or path 231 via amplifier 222. Voltage between variable resistor 220 and array 20 is controlled to a desired voltage as determined by voltage regulator 204. The desired voltage value may be supplied by controller 108 or another device, and voltage regulator 204 controls voltage at conductor or path 242 to a level that provides the desired voltage in a current path between array 20 and variable resistor 220. Variable resistor 220 controls current flow from array 20 to current sense resistor 255 in the direction of arrow 245. The desired voltage may also be adjusted responsive to the type of lighting device, type of work piece, curing parameters, and various other operating conditions. An electrical current signal may be fed back along conductor or path 236 to controller 108 or another device that adjusts the intensity voltage control signal provided. In particular, if the electrical current signal is different from a desired electrical current, the intensity voltage control signal passed via conductor 230 is increased or decreased to adjust electrical current through array 20. A feedback current signal indicative of electrical current flow through array 20 is directed via conductor 236 as a voltage level that changes as electrical current flowing through current sense resistor 255 changes.

In one example where the voltage between variable resistor 220 and array 20 is adjusted to a constant voltage, current flow through array 20 and variable resistor 220 is adjusted via adjusting the resistance of variable resistor 220. Thus, a voltage signal carried along conductor 240 from the variable resistor 220 does not go to the array 20 in this example. Instead, the voltage feedback between array 20 and variable resistor 220 follows conductor 240 and goes to a voltage regulator 204. The voltage regulator 204 then outputs a voltage signal 242 to the array 20. Consequently, voltage regulator 204 adjusts its output voltage in response to a voltage downstream of array 20, and current flow through array 20 is adjusted via variable resistor 220. Controller 108 may include instructions to adjust a resistance value of variable resistor 220 in response to array current fed back as a voltage via conductor 236. Conductor 240 allows electrical communication between the cathodes 202 of LEDs 110, input 299 (e.g., a drain of an N-channel MOSFET) of variable resistor 220, and voltage feedback input 293 of voltage regulator 204. Thus, the cathodes 202 of LEDs 110 an input side 299 of variable resistor 220 and voltage feedback input 293 are at the same voltage potential.

The variable resistor may take the form of an FET, a bipolar transistor, a digital potentiometer or any electrically controllable, current limiting device. The drive circuit may take different forms depending upon the variable resistor used. The closed loop system operates such that an output voltage regulator 204 remains about 0.5 V above a voltage to operate array 20. The regulator output voltage adjusts voltage applied to array 20 and the variable resistor controls current flow through array 20 to a desired level. The present circuit may improve production of a constant irradiance output from array 20. In the example of FIG. 2, the variable resistor 220 typically produces a voltage drop in the range of 0.6V. However, the voltage drop at variable resistor 220 may be less or greater than 0.6V depending on the variable resistor's design.

Referring now to FIG. 3, an example amplifier 222 for supplying an irradiance or intensity control voltage to a variable resistor that controls electrical current flow through a lighting array is shown. Amplifier 222 includes an operational amplifier 302. A control voltage for outputting a desired irradiance or light intensity is input to amplifier 222 at non-inverting input 304. Amplifier 222 includes output 305 to operate variable resistor 220 shown in FIG. 2. Negative feedback loop 350 includes only three resistors including a first resistor (R1) 310, second resistor (R2) 312, and third resistor ($R_T$) 314. In this example, resistor 314 is a negative temperature coefficient device (e.g., a thermistor). The first resistor (R1) sets the gain change from the minimum to maximum lighting array temperature. The second resistor (R2) sets a slope maximum to a predetermined lighting array equilibrium temperature.

Thus, amplifier 222 is a non-inverting amplifier that includes negative feedback in negative feedback loop 350. The inverting input 303 and non-inverting input 304 are very high impedance. Consequently, substantially no current flows into inverting input 303 or non-inverting input 304. The amplifier gain may be expressed as:

$$\frac{Vo}{Vin} = 1 + \frac{R1}{R2 + R_T}$$

where Vo is the output voltage of amplifier 222 at 305, Vin is the voltage at inverting input 303, R1 is the value of resistor 310, R2 is the value of resistor 312, and $R_T$ is the resistance value of negative temperature coefficient device 314. Thus, if the lighting array temperature is cold and the value of $R_T$ is very high, the gain is approximately equal to one. If the lighting array temperature is warm and the value of $R_T$ is very low, the gain is approximately equal to 1.22 when R1 equals 499 ohms and R2 equals 2.32 K ohms. In some examples, the output of amplifier 222 may be referred to as an automatic power control (APC) command or signal.

It should be appreciated that the values of R1, R2, and $R_T$ may vary between different lighting systems. Additionally, the amplifier gain may be different in some embodiments without departing from the scope and intent of the present description.

Figure 4:
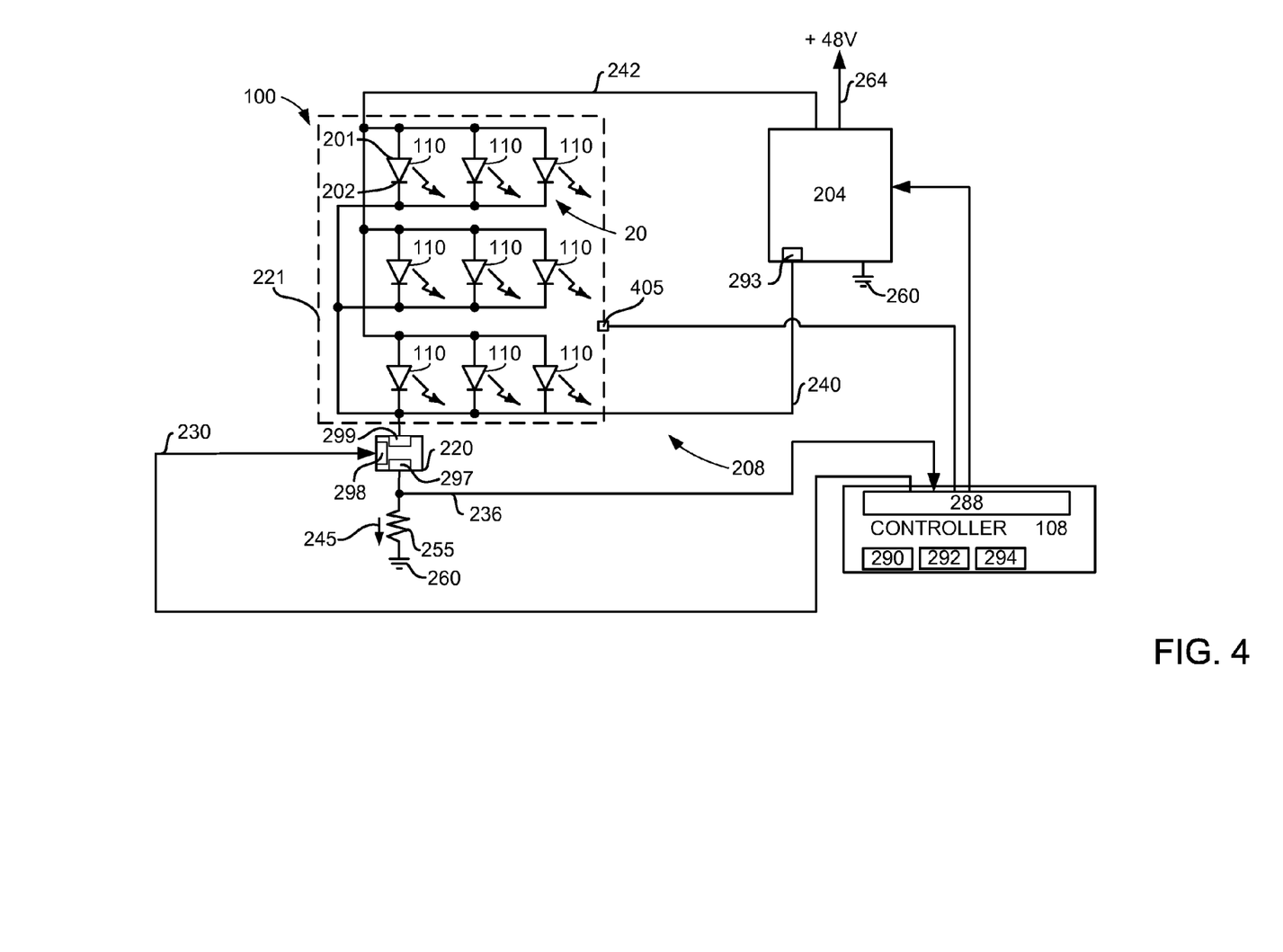

Referring now to FIG. 4, a schematic of a second lighting system circuit that provides substantially constant lighting array irradiance output is shown. FIG. 4 includes some of the same elements as the first lighting system circuit shown in FIG. 2. Elements in FIG. 4 that are the same as elements in FIG. 2 are labeled with the same numeric identifiers. For the sake of brevity, a description of same elements between FIG. 2 and FIG. 4 is omitted; however, the description of elements in FIG. 2 applies to the elements in FIG. 4 that have the same numerical identifiers.

The lighting system shown in FIG. 4 includes lighting array 20 which includes LEDs 110. The system of FIG. 4 does not include an external amplifier 222 supplying an intensity or irradiance level to variable resistor 220. Instead, controller 108 includes micro controller instructions for implementing amplifier 222. Thus, the amplifier and its gain described in FIG. 3 are implemented within controller 108 via non-transitory instructions. Additionally, controller 108 may determine a resistance or output of device 405 and apply a negative temperature coefficient transfer function to output of the device. The negative temperature coefficient transfer function may output a resistance value that increases for lower temperatures and decreases for higher temperatures as shown by curve 502 of FIG. 5. Alternatively, device 405 may be a negative temperature coefficient device having a resistance that is determined by controller 108. The resistance value is then applied to a gain function and the irradiance command is output to variable resistance device 220 via conductor 230. In this way, the hardware of amplifier 222 shown in FIG. 2 may be replaced via controller instructions stored in non-transitory memory of controller 108.

Thus, the systems of FIGS. 1-4 provide for a system for operating one or more light emitting devices, comprising: at least one light emitting device; a negative temperature coefficient device in thermal communication with the at least one light emitting device; and an amplifier including a negative feedback loop, the negative temperature coefficient device included in the negative feedback loop. The system includes where the amplifier is an operational amplifier, and further comprising a variable resistance device and a controller, the variable resistance device in electrical communication with a cathode side of the at least one light emitting device.

In some examples, the system includes where the variable resistance device is a field effect transistor and where an output of the amplifier is in electrical communication with a gate of the field effect transistor. The system includes where a drain of the field effect transistor is in electrical communication with the at least one light emitting device. The system of claim 1, where the negative feedback loop electrically couples an inverting input of the amplifier and an output of the amplifier. The system includes where the negative temperature coefficient device is a thermistor. The system includes where the at least one or more light emitting devices is a light emitting diode.

The system of FIGS. 1-4 also provides for a system for operating one or more light emitting devices, comprising: at least one or more light emitting devices; a negative temperature coefficient device in thermal communication with the at least one or more light emitting devices; a variable resistance device in electrical communication with one or more cathodes of the at least one or more light emitting devices; an amplifier including a negative feedback loop, the negative temperature coefficient device included in the negative feedback loop, an output of the amplifier in electrical communication with the variable resistance device, the negative feedback loop including three resistors. The system includes where the three resistors are the only three resistors in the negative feedback loop. The system includes where the negative feedback loop provides electrical communication between an inverting input of the amplifier and an output of the amplifier. The system further comprises a controller, the controller in electrical communication with a non-inverting input of the amplifier. The system includes where the controller includes instructions stored in non-transitory memory for supplying a voltage to the amplifier, the voltage corresponding to a desired irradiance output of the at least one or more light emitting devices. The system further comprises a voltage regulator, the voltage regulator in electrical communication with the at least one or more light emitting devices.

Figure 5:
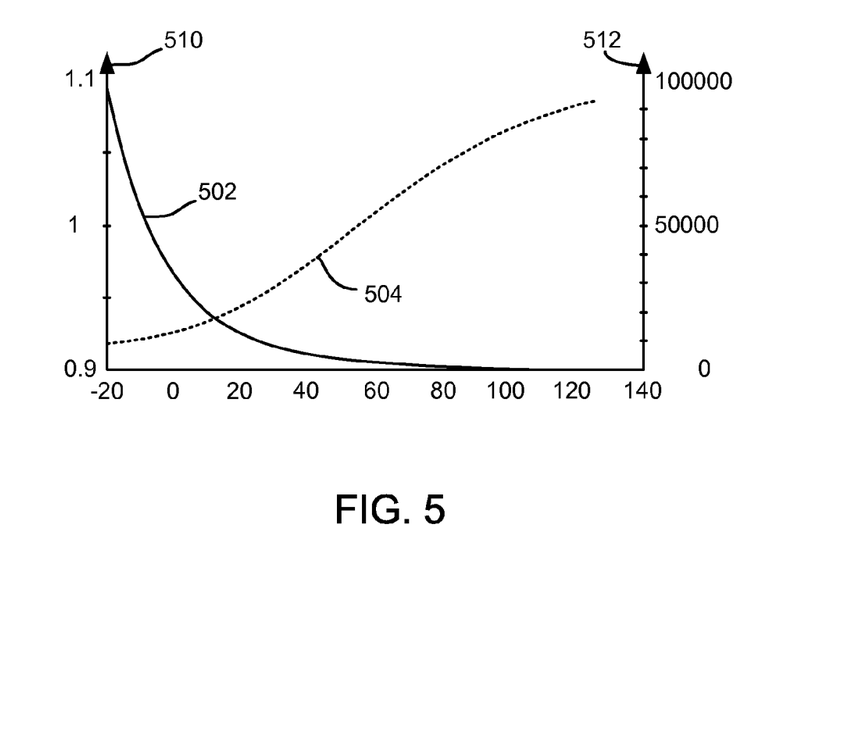
FIGS. 5 and 6 show example plots of selected irradiance control system control parameters.

Referring now to FIG. 5, an example plot of resistance of a negative temperature coefficient device and normalized gain of an automatic power control (APC) versus lighting array temperature. The left vertical axis 510 represents normalized APC gain, or the gain of amplifier 222 of FIGS. 2 and 3. The right vertical axis 512 represents resistance of a temperature sensing device that is in thermal communication with lighting elements of lighting array 20 shown in FIG. 1. The horizontal axis represents lighting array temperature and temperature increases from the left side of the plot to the right side of the plot.

Curve 502 represents output of a negative temperature coefficient device (e.g., a thermistor). As shown, the resistance increases at colder temperature and decreases at higher temperatures. By placing the negative temperature coefficient device (e.g., 314 of FIG. 3) in a negative feedback path of an amplifier, amplifier gain may be shaped as shown by curve 504.

Curve 504 represents gain of amplifier 222 shown in FIGS. 2 and 3. The gain exhibits an S like shape where amplifier gain is lower at lower lighting array temperatures and higher at higher lighting array temperatures. In this example, the lighting array equilibrium temperature is 55° C. when ambient temperature is 20° C. and the lighting array is outputting a predetermined irradiance level. The equilibrium temperature is a temperature that the lighting array normally operates at when ambient temperature is 20° C. and the lighting array is outputting the predetermined irradiance level. It may be observed that the slope of the amplifier gain is greatest about the equilibrium temperature of 55° C. so that any variation from 55° C. causes the amplifiers output to increase or decrease the resistance of variable resistor 220 shown in FIG. 2. Thus, power supplied to the lighting array is adjusted responsive to temperature of the array.

Figure 6:
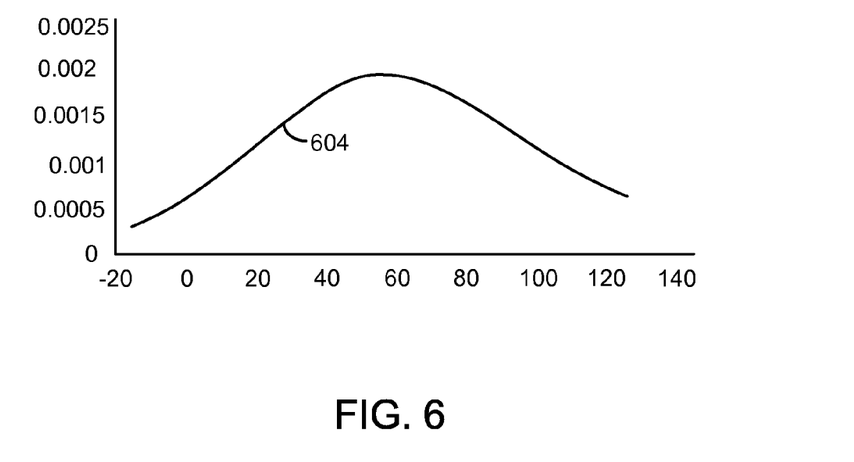
Figure 7:
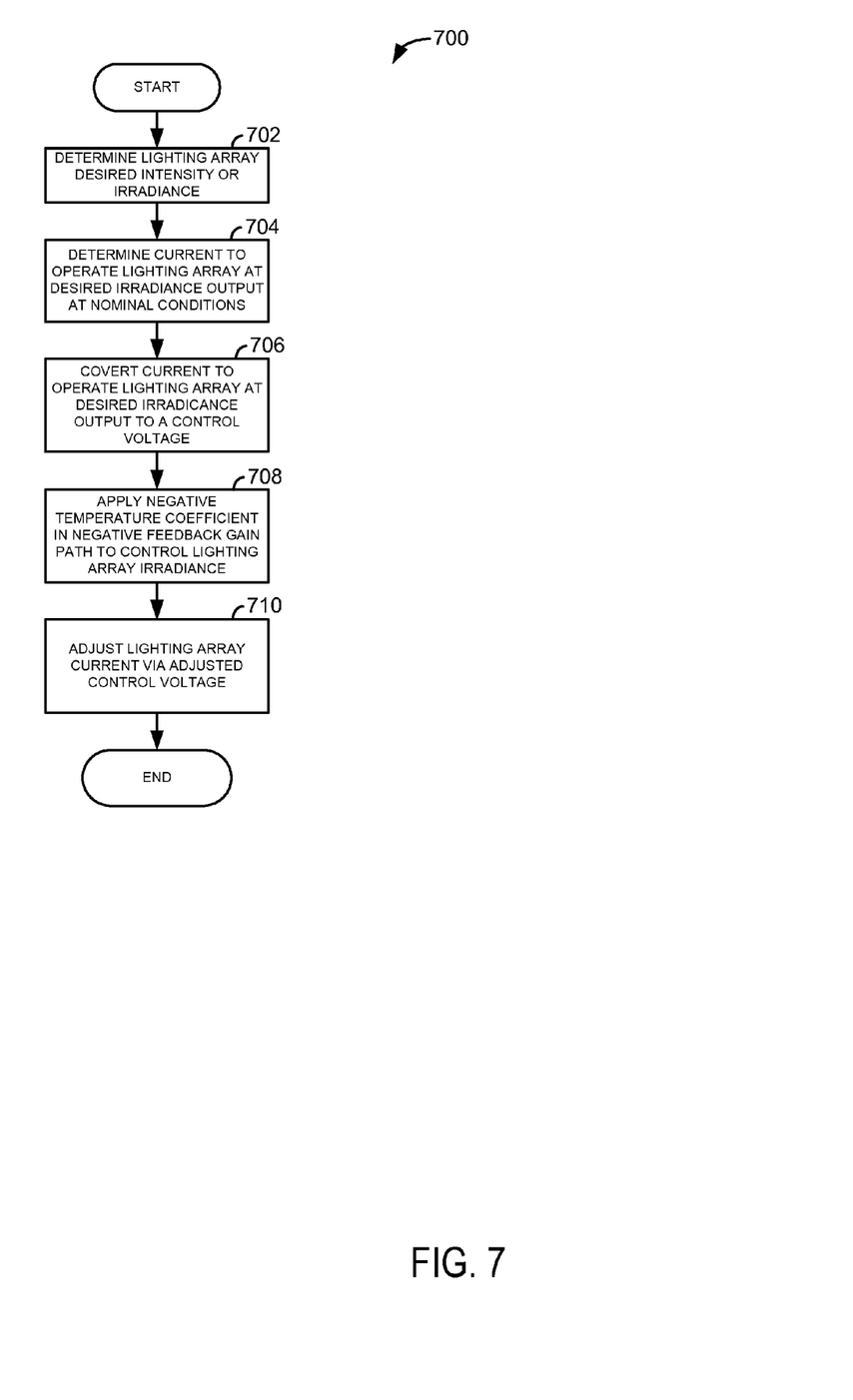
FIG. 7 shows an example method for controlling irradiance in a lighting system.

Referring now to FIG. 6, an example plot of change in amplifier gain divided by change in lighting array temperature is shown. The vertical axis represents change in amplifier gain. The horizontal axis represents lighting array temperature.

Curve 604 represents change in amplifier gain divided by change in lighting array temperature. Curve 604 may also be described as a first derivative of lighting array amplifier gain with respect to lighting array temperature. Thus, it may be observed that the maximum gain change is at 55° C. for this particular example. However, the location of maximum gain may be adjusted for different lighting array characteristics. By maximizing the gain about the equilibrium temperature, lighting array output power may be adjusted to drive lighting array irradiance back to its desired level even in the presence of lighting array temperature variation.

Referring now to FIG. 7, an example method for controlling lighting array electrical power and irradiance is shown. The method of FIG. 7 may be included as instructions stored in non-transitory memory of a controller as shown in FIGS. 1, 2, and 4.

At 702, lighting array desire intensity or irradiance is determined. The desired intensity may vary from lighting system to lighting system and from work piece to work piece. In one example, the desired intensity may be determined from a control parameter file or an operator may manually select the desired intensity or irradiance level. The control parameter file may include empirically determined values of irradiance for the lighting array. Method 700 proceeds to 704 after the lighting array irradiance or intensity is determined.

At 704, method 700 determines current and/or power to operate the lighting array at the irradiance level determined at 702. In one example, lighting array power may be determined via indexing a function or table of that includes empirically determined current or power levels that may be indexed via the desired irradiance. The table or function outputs the desired lighting array current and/or power and proceeds to 706.

At 706, method 700 converts the desired current or power into a control voltage or current for operating the variable resistor that controls current flow through the lighting array. In one example, method 700 passes the desired current or power value through a transfer function to determine a lighting array irradiance command. The irradiance command may be in the form of a voltage or a value of a parameter. Method 700 proceeds to 708 after the irradiance command is determined.

At 708, method 700 applies a negative temperature coefficient (e.g., curve 502 of FIG. 5) device or transfer function in a negative feedback loop of an amplifier that supplies a control voltage or current to a variable resistor.

In one example, the negative temperature coefficient device may be included in a negative feedback loop of an amplifier as shown in FIGS. 2 and 3. The negative temperature coefficient device adjusts a gain of the amplifier as a temperature of the lighting array changes. In one example, the gain of the amplifier is as described in FIG. 3. The control voltage determined at 706 is applied to a non-inverting input of the amplifier.

In another example, a voltage or resistance representing a temperature of the lighting array is input to a controller and the voltage or resistance is directed through a transfer function that converts the voltage or resistance into a negative temperature coefficient output parameter. For example, if a voltage is input to the controller that represents a lighting array temperature, the voltage is converted to a resistance value such that the resistance value has a transfer function similar to curve 502 of FIG. 5. The resistance value may then be applied to a transfer function representing an amplifier having a negative temperature coefficient device in its negative feedback path. For example, the controller may implement the amplifier shown in FIG. 3 and its transfer function in the form of a digital filter stored in memory. The control voltage determined at 706 is applied to the digital filter. Method 700 proceeds to 710 after the negative temperature coefficient is applied to a negative feedback path of an amplifier that adjusts lighting array current and\or power.

At 710, method 700 adjusts lighting array current and/or power via supplying a current or voltage to a variable resistor. In one example, the current or power may be adjusted via an amplifier as is shown in FIG. 3. In another example, the current or power may be adjusted via a controller supplying a current or voltage from an analog output, the current or voltage determined from output of the digital filter described at 708.

Thus, the method of FIG. 7 may be implemented via a digital controller or an analog circuit. The method applies a negative temperature coefficient to a negative feedback path of an amplifier to maintain lighting array irradiance at a constant level in the presence of varying lighting array temperatures.

The method of FIG. 7 provides for a method for operating one or more light emitting devices, comprising: sensing temperature of a thermal conductor in thermal communication with one or more light emitting devices; transforming or converting the sensed temperature into a control parameter having a negative temperature coefficient; and adjusting current flow through the one or more light emitting devices in response to output of a controller that includes the control parameter in a negative feedback path. The method includes where the sensed temperature is transformed into a control parameter having a negative temperature coefficient via a thermistor. The method includes where the current flow through the one or more light emitting devices is adjusted via an operational amplifier. The method includes where the current flow through the one or more light emitting devices is adjusted via instructions in the controller. The method includes where adjusting current flow includes adjusting a gain of an amplifier in proportion to the sensed temperature. The method includes where the gain has a maximum slope at an equilibrium temperature of the one or more light emitting devices. The method includes where the current flow is adjusted to provide a substantially constant irradiance output from the one or more light emitting devices.

Note that the example control and estimation routines included herein can be used with various lighting system configurations. The control methods and routines disclosed herein may be stored as executable instructions in non-transitory memory and may be carried out by the control system including the controller in combination with the various sensors, actuators, and other lighting system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the lighting control system, where the described actions are carried out by executing the instructions in a system including the various lighting system hardware components in combination with the electronic controller.

This concludes the description. The reading of it by those skilled in the art would bring to mind many alterations and modifications without departing from the spirit and the scope of the description. For example, lighting sources producing different wavelengths of light may take advantage of the present description.

The invention claimed is:

1. A system for operating one or more light emitting devices, comprising:
    at least one light emitting device;
    a negative temperature coefficient device in thermal communication with the at least one light emitting device; and
    an amplifier including a negative feedback loop, the negative temperature coefficient device included in the negative feedback loop, the amplifier having a gain which has a maximum slope at an equilibrium temperature of the one or more light emitting devices.

2. The system of claim 1, where the amplifier is an operational amplifier, and further comprising a variable resistance device and a controller, the variable resistance device in electrical communication with a cathode side of the at least one light emitting device.

3. The system of claim 2, where the variable resistance device is a field effect transistor and where an output of the amplifier is in electrical communication with a gate of the field effect transistor.

4. The system of claim 3, where a source of the field effect transistor is in electrical communication with the at least one light emitting device.

5. The system of claim 1, where the negative feedback loop electrically couples an inverting input of the amplifier and an output of the amplifier.

6. The system of claim 1, where the negative temperature coefficient device is a thermistor.

7. The system of claim 1, where the at least one light emitting device is a light emitting diode.

8. A system for operating one or more light emitting devices, comprising:
    at least one or more light emitting devices;
    a negative temperature coefficient device in thermal communication with the at least one or more light emitting devices;
    a variable resistance device in electrical communication with one or more cathodes of the at least one or more light emitting devices;
    an amplifier including a negative feedback loop, the negative temperature coefficient device included in the negative feedback loop, an output of the amplifier in electrical communication with the variable resistance device, the negative feedback loop including three resistors; and a controller in electrical communication with the amplifier, where the controller includes instructions stored in non-transitory memory for supplying a voltage to the amplifier, the voltage corresponding to a desired irradiance output of the at least one or more light emitting devices.

9. The system of claim 8, where the three resistors are the only three resistors in the negative feedback loop.

10. The system of claim 9, where the negative feedback loop provides electrical communication between an inverting input of the amplifier and the output of the amplifier.

11. The system of claim 9, where the controller is in electrical communication with a non-inverting input of the amplifier.

12. The system of claim 9, further comprising a voltage regulator, the voltage regulator in electrical communication with the at least one or more light emitting devices.

13. A method for operating one or more light emitting devices, comprising:
sensing temperature of a thermal conductor in thermal communication with one or more light emitting devices;
transforming the sensed temperature into a control parameter having a negative temperature coefficient; and
adjusting current flow through the one or more light emitting devices in response to output of a controller that includes the control parameter in a negative feedback path, where adjusting current flow includes adjusting a gain of an amplifier in proportion to the sensed temperature.

14. The method of claim 13, where the gain has a maximum slope at an equilibrium temperature of the one or more light emitting devices.

15. The method of claim 13, where the sensed temperature is transformed into the control parameter having the negative temperature coefficient via a thermistor.

16. The method of claim 13, where the current flow through the one or more light emitting devices is adjusted via an operational amplifier.

17. The method of claim 13, where the current flow through the one or more light emitting devices is adjusted via instructions in the controller.

18. The method of claim 13, where the current flow is adjusted to provide a substantially constant irradiance output from the one or more light emitting devices.

* * * * *